United States Patent [19]
Monchiero

[11] Patent Number: 6,080,342
[45] Date of Patent: Jun. 27, 2000

[54] METHOD AND SYSTEM FOR MAKING A SOLID PARTICLE AGGLOMERATE

[76] Inventor: Giovanni Monchiero, Via Ravizza, 5, 28066 Galliate (Novara), Italy

[21] Appl. No.: 09/059,974

[22] Filed: Apr. 14, 1998

[30]  Foreign Application Priority Data

Apr. 17, 1997 [IT]  Italy ................................. MI97A0896

[51] Int. Cl.⁷ ..................................................... B29B 9/08
[52] U.S. Cl. ............................... 264/15; 264/109; 264/117
[58] Field of Search ............................... 264/15, 109, 117

[56]  References Cited

U.S. PATENT DOCUMENTS 4,349,366  9/1982  Saeman ..................... 264/117
5,868,982  2/1999  Strait et al. ............... 264/115

*Primary Examiner*—Mary Lynn Theisen
*Attorney, Agent, or Firm*—Hedman, Gibson & Costigan, P.C.

[57]  ABSTRACT

A method for making a solid agglomerate, having a preset size and shape, including a plurality of inert material particles, comprises the steps of: rotating the inert material particles, applying to the surface of the rotating particle an at least one component reactive resin, supplying the particles into a vessel holding each of the particles in contact with the adjoining particles at least for a time necessary to carry out the chemical reaction of the reactive resin, to provide a solid agglomerate.

The invention also relates to a system for carrying out the method and the product obtained thereby.

12 Claims, 3 Drawing Sheets

METHOD AND SYSTEM FOR MAKING A SOLID PARTICLE AGGLOMERATE

BACKGROUND OF THE INVENTION

The present invention relates to a method for making solid agglomerates, having a preset shape and size, comprising particles having preferably the shape of substantially spheroidal granules, starting from waste or residues of inert materials, such as polyurethane, polystyrene, paperboard, wood, rubber or other materials, by impregnating said particles with either mono or bi-component reactive resins.

The present invention relates furthermore to a system for impregnating said particles and the product obtained by said impregnating method.

A very important requirement of a lot of industrial fields is that of properly reusing production waste or residues such those deriving from packaging or other processing operations in order to provide products adapted to be advantageously and unexpensively used.

This, in particular, by way of a not limitative example, is true for rubber, paperboard, wood, polystyrene granule and the like packaging waste.

Another interesting field of application is the reuse of used tyre scraps, or pneumatic tyre making waste, comprising granules or components which can be ground to a granule form, of inert materials of the above mentioned types and the like.

Recovering method are indeed known for recovering either flexible or rigid polyurethane scraps.

However, these prior recovering methods are very expensive and, moreover, require large size operating systems.

SUMMARY OF THE INVENTION

Accordingly, the aim of the present invention is to provide a method and system allowing to recover and reuse a broad range or waste materials and products, of the above mentioned type.

Within the scope of this aim, a main object of the present invention is to recover packagings made of polyurethane, polystyrene, paperboard, wood, rubber and other inert materials which can be reduced to a granule form.

A further object of the present invention is to provide a method and system for making articles of manufacture starting from inert materials, adapted to be ground to a granule form, which articles of manufacture can be suitably made, in any desired size and shape, by using molds or molding vessels.

Another object of the present invention is to provide a method and system allowing to easily make, from recovered materials, articles of manufacture having different strength and/or flexibility properties, depending on the material forming said granules.

According to one aspect of the present invention, the above mentioned aim and objects are achieved by the present invention which specifically relates to a method for forming solid agglomerates constituted by a plurality of inert material particles. The method comprises the steps of rotating the inert material particles, applying on the surfaces of the rotating particles a reactive resin including at least a resin component, supplying the particles to a vessel, for holding each particle in contact with adjoining particles at least for a time allowing the reactive resin to chemically react to provide the agglomerate.

According to a preferred embodiment of the method of the invention, the particles are rotated by a pair of conveyor belts, arranged opposite to one another in order to define a conveying path therewithin said particles are caused to slide, said particles contacting both said conveyor belts for at least a portion of the sliding movement of said particles.

Said conveyor belts are provided with different feeding speeds or rates, both in absolute value and/or in direction.

The resin applying step, in which a resin material is applied or coated on said particles, is performed by supplying said resin on at least one of the mentioned conveyor belts.

In this connection it should be pointed out that said resin can also be centrally supplied, in which case the conveyor belts will operate as dispensing elements for said resin/resins.

According to a further modified embodiment of the invention, the resin applying or coating step provides to use a two component reactive resin.

According to a further modified embodiment of the subject method, said particles are supplied to a vessel holding at least an article herein, so that said particles are arranged in any spaces provided between the article and inner sides of said vessel, so as to form, by the above mentioned chemical reaction, a solid agglomerate adapted for packaging said article.

The present invention also relates to a system for carrying out said method, said system comprising a temporary holding tank including particle conveying means, at least a pair of conveyor belts, at least a delivery nozzle for delivering at least a component of the reactive resin, said delivery nozzle being associated with said at least a pair of conveyor belts, and a vessel for holding therein said particles at least for a time allowing said reactive resin to chemically react to form said agglomerate.

Preferably, the conveyor belts are provided with holding means for laterally holding or restraining said particles.

The present invention also relates to a product made by the inventive method, having a plurality of inert material particles, and made by contacting each said particle with a plurality of adjoining particles, after having applied to the surfaces of said particles a reactive resin including at least a component, for a time allowing said reactive resin to chemically react to provide a solid agglomerate having a preset shape and size.

Preferably said particles comprise substantially spheroidal granules or grains of a material selected from polyurethane, polystyrene, paperboard, wood, rubber scraps or other inert material scraps.

The invention provides several advantages over the prior art.

At first, the method according to the present invention can be carried out in a simple and unexpensive manner and does not require expensive systems and tools. Moreover, it can be applied to a very broad range of applications. In fact, it allows to reuse or recover a plurality of inert materials, preferably ground to a granule or grain form, obtained from a lot of different making, packaging or the like scraps.

The granules are so agglomerated as to provide articles of manufacture having any desired shape and size.

Said articles of manufacture or products can have a very broad range of desired properties, depending on the material forming the granules therefrom they are made. By way of a merely indicative but not limitative example of possible applications of the invention it is possible to mention: flexible polyurethane foam agglomerates, rigid polyurethane panels, cylindric configuration plastic elements, semispheric configuration plastic elements and the like, specifically designed for preventing motor vehicles from being abusively parked, and so on.

A further application of the present invention specifically relates the packaging field: in fact, the invention allows to easily recover packages of polystyrene, paperboard, wood, rubber, by agglomerating granules of these materials about the article or articles to be packaged.

BRIEF DESCRIPTION OF THE DRAWINGS

The invention will be hereinafter disclosed in a more detailed manner, by way of an illustrative but not limitative example, with reference to the accompanying drawings, where.

DESCRIPTION OF THE PREFERRED EMBODIMENTS

The present invention has been specifically designed for application to granule materials, which can be possibly obtained by a preliminary grounding step.

In the following disclosure reference will be specifically made to granules or grains having an approximately spheroidal shape, but it should, be apparent that the invention is not limited to such a spheroidal configuration.

Figure 1:
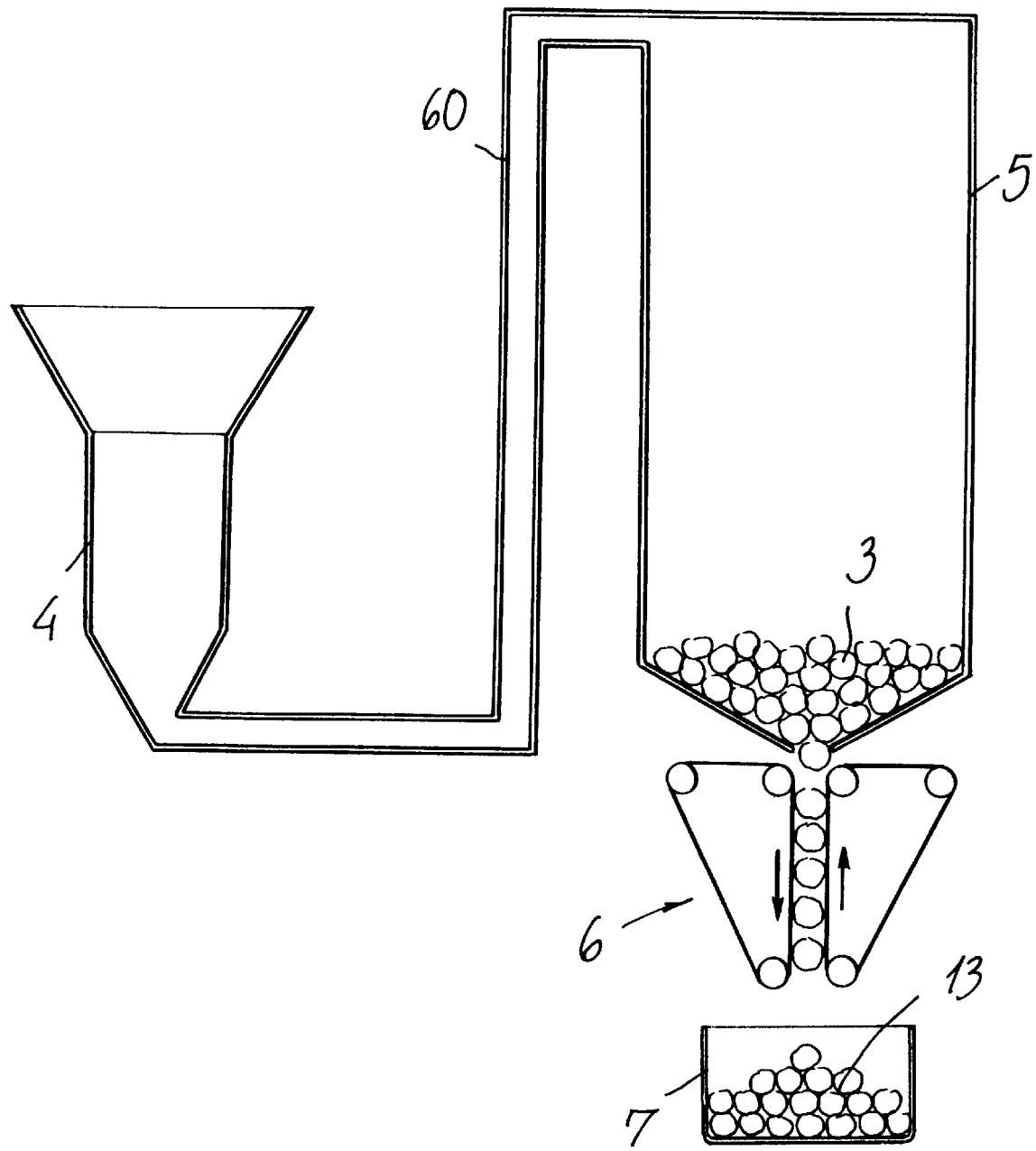
FIG. 1 is a schematic view illustrating a system for carrying out a method for making a solid particle agglomerate according to the present invention.

FIG. 1 schematically illustrates an exemplary, but not limitative, embodiment of a system for carrying out a method for impregnating the subject granules.

In particular, are herein shown a granulating device 4 provided for bringing, by a grinding operation, the material to be processed by the inventive method to a granule form, a duct 60 conveying the granules 3 to a tank or silo 5, as well as an impregnating unit 6, which will be disclosed in a more detailed manner hereinafter, and a vessel 7 for holding therein the granules 3 to form a solid agglomerate 13.

Figure 2:
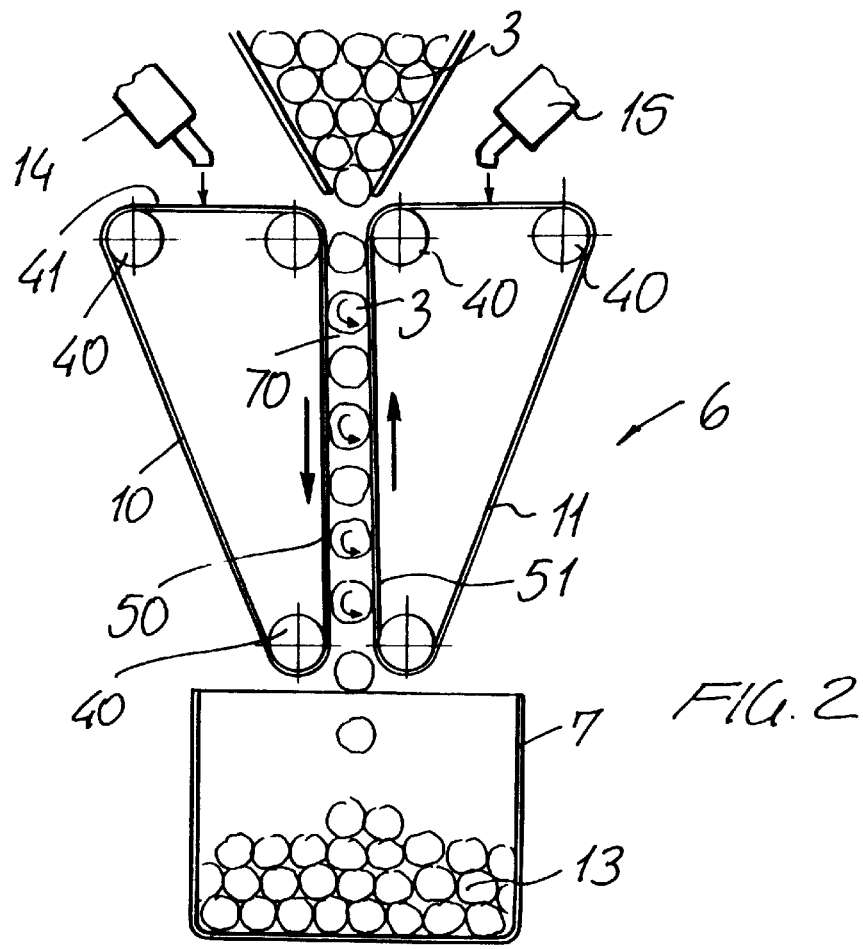
FIG. 2 is a schematic view illustrating an impregnating unit included in the system shown in FIG. 1.

FIG. 2 illustrates in a more detailed manner the impregnating unit 6 of the system shown in FIG. 1.

More specifically, said impregnating unit 6 comprises a pair of conveyor belts 10 and 11, driven by driving rollers 40 and a pair of nozzles 14 and 15, for delivering or ejecting reactive resin components.

Each of said conveyor belts 10 and 11. is provided with vertical conveyor belt portions 50 and 51 which are opposite to one another so as to form a conveying path 70 in which the particle or granules 3 are slidably driven, while rotating on themselves.

The conveyor belts 10 and 11 are moreover each provided with a conveyor belt portion, respectively indicated by 41 and 42, on which the delivery or dispensing nozzles 14 and 15 eject the reactive resin components.

FIG. 2 also shows the vessel 7 inside which the granule agglomerate 13 is formed.

Figure 3:
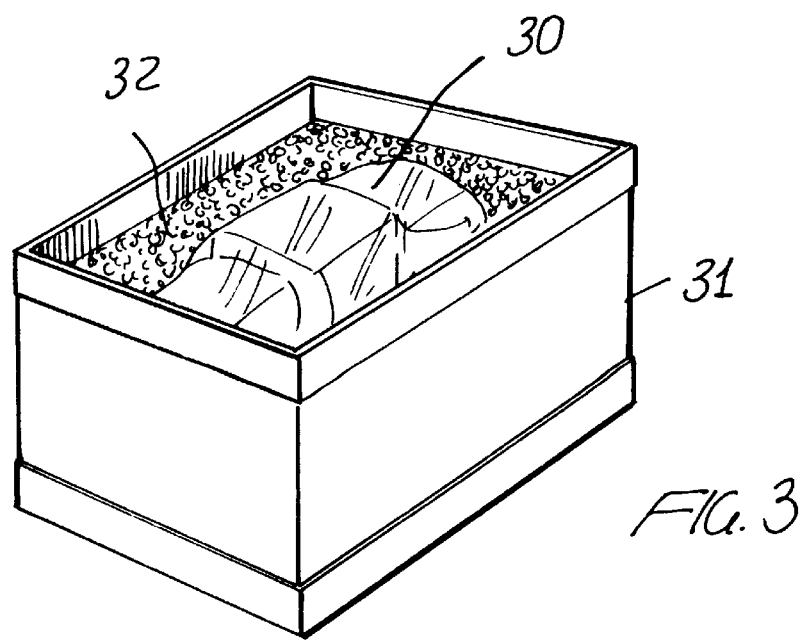
FIG. 3 is a perspective view illustrating a product made by a method according to the present invention, specifically designed to be used as a packaging material.

FIG. 3 is a perspective view illustrating the product obtained by the method according to the present invention, in the case in which packaging material is used inside a vessel 31 provided for carrying an article 30. The packaging material comprises a solid granule agglomerate 32, which fully encompasses the article 30 to be packaged.

In the case shown in FIG. 3, the article 30 comprises a motor packaged by a protecting sheet element, for example of polyethylene.

In this case, the granules will be arranged in any spaces available between the article 30 and inner sides of the vessel 31.

Figure 4:
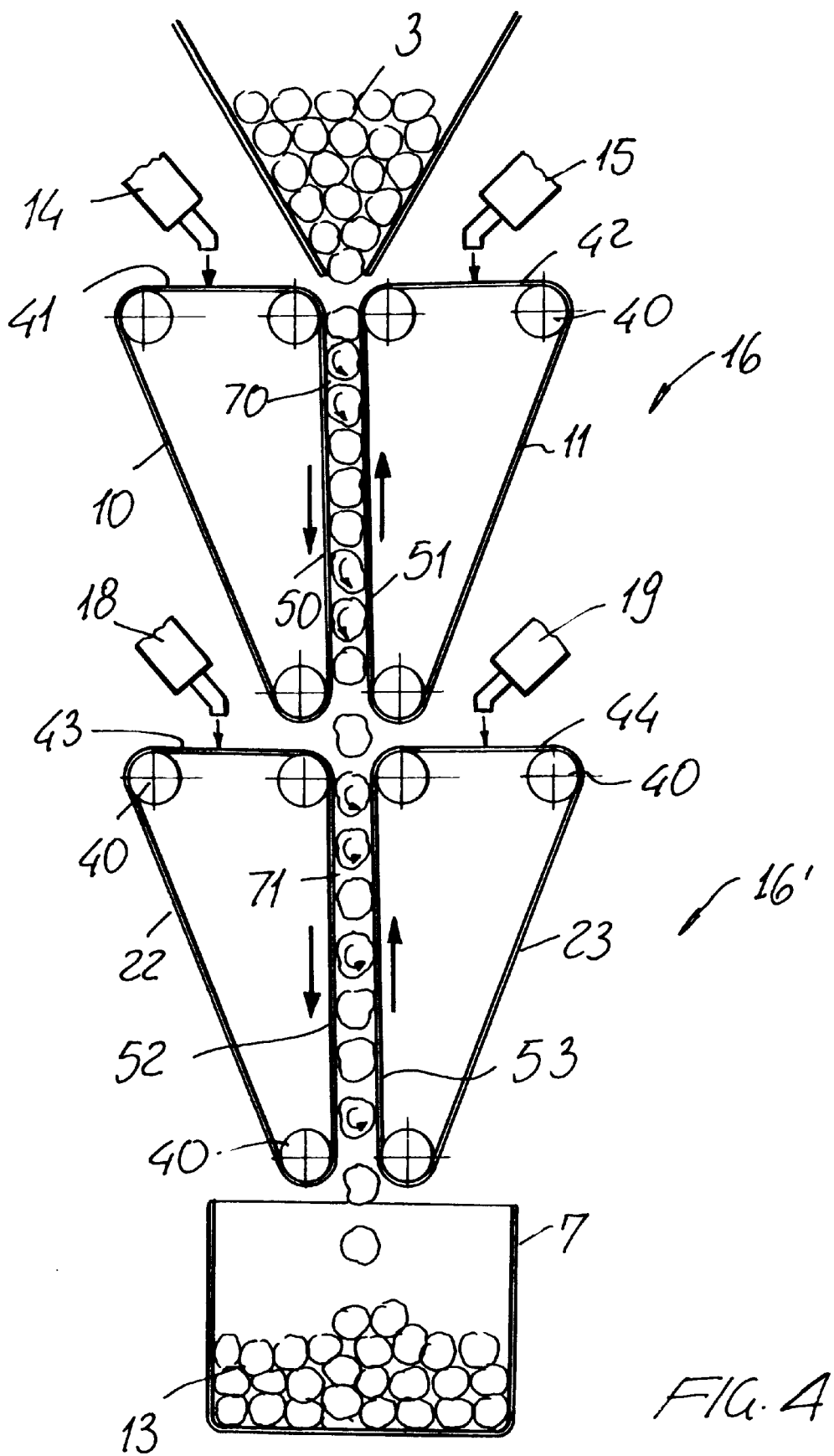
FIG. 4 is a further schematic view illustrating a modified embodiment of an impregnating unit included in a system for carrying out the method according to the present invention.

FIG. 4 schematically illustrates a modified embodiment of the impregnating unit of a system for carrying out the method according to the invention.

In this modified embodiment, the impregnating unit comprises a first pair 16 of conveyor belts 10 and 11, similar to those disclosed with reference to FIG. 2, and a second pair 16' of conveyor belts 22 and 23 underlaying the first conveyor belt pair 6.

The conveyor belt portions 52 and 53 of the conveyor belts 22 and 23 define a path 71 therealong said granules 3 can slide, said path 71 underlaying the path 70 defined by the vertical conveyor belt portions 50 and 51, thereby said path 71 can properly receive the granules 3 falling thereon by gravity.

At said portions 43 and 44 two reactive resin component delivery nozzles 18 and 19 are arranged.

According to the present invention, the method for making a solid agglomerate starting from the mentioned granules 13 is carried out as follows: the granules 3 are supplied to the tank 5 and will fall by gravity into the path defined by the vertical conveyor belt portions 50 and 51.

The conveyor belts 10 and 11 are fed with different speeds, to cause the granule 3 to be rotated because of the friction on the walls pertaining to the vertical conveyor belt portions 50 and 51.

In this connection it should be pointed out that the granules 3 can also be rotated, for example, by causing the conveyor belts 10 and 11 to be fed with speeds of different absolute values, and in an opposite direction.

The delivery or dispensing nozzles 14 and 15 deliver a reactive resin respectively to the portions 41 and 42 of the conveyor belts 10 and 11. Owing to the rotary movement of the granules 3, said reactive resin will impregnate and coat the surface of each individual granule 3.

Finally, the granules 3 will fall into the vessel 7, so as to fully fill any spaces thereof, and will be held in said vessel at least for the time necessary to allow a chemical reaction of said resin, which will cause each granule 3 to adhere to the adjoining granules, in order to provide said solid agglomerate 13.

The above disclosed method provides to supply a single-component resin: however it is possible to use the system shown in FIG. 2 with a reactive resin including two components, which will be hereinafter indicated by the reference letter A and B.

In this case, the above disclosed method can be suitably modified, without departing from the scope of the invention, as follows.

One of the two nozzles will deliver on its underlaying conveyor belt portion the component A, whereas the other nozzle will deliver on its underlaying conveyor belt the resin component B.

Thus, as the two conveyor belts are driven, the two resin components A and B will be brought into contact and mixed on the surface of each granules 3 rolling between the two vertical conveyor belt portions.

Thus, the two components A and B of the two-component resin will provide a polymerizing reaction, allowing said granules 3 to adhere to the adjoining granules, in order to provide the mentioned solid agglomerate 13 inside the vessel 7.

A further modified embodiment of the method according to the present invention provides to use a system of the type disclosed with reference to FIG. 4.

In this case, the application of the resin on the granules 13 is performed by delivering a first component, for example the component A, of the reactive resin on both the horizontal portions 41 and 42 of the conveyor belts 10 and 11 and by delivering the second component B on both the horizontal portions 43 and 44 of the conveyor belts 22 and 23 underlaying the pair of conveyor belts 10 and 11. The resin component B is delivered by the delivery nozzles 18 and 19.

In this case, the reactive resin component A and component B will be brought into mutual contact and will be mixed on the rolling granule 3 surfaces at said path 71 defined by the conveyor belts 22 and 23. In this connection it should be pointed out that it would be possible to reverse the mixing order of the components A and B, provided that the mixing of said components is performed at said impregnating unit 16'.

Even in this case, the speeds of the conveyor belts 10 and 11 and those of the conveyor belts 22 and 23 will be different, and/or will have an opposite direction, in order to cause said granules 3 to rotate or roll.

Preferably, the conveyor belts 10, 11 and 22, 23 comprise moreover means for laterally restraining the granules 3. In particular, fixed side board can be arranged laterally of the conveyor belts, or said conveyor belts can be contoured so that their cross-sections present, to a plane perpendicular to the feeding direction of said conveyor belts, a concavity and/or a pair of ridges adapted to form side-boards or side-walls directly formed on the conveyor belts.

Preferably, the reactive resins to be used will be selected from polyurethane, epoxyde, phenolic, polyester, urea-formaldehyde resins, or other like types of resins.

The invention also relates to a product or article comprising a plurality of inert material granules, said article being made causing each granule to contact a plurality of adjoining granules, after having applied to the surfaces of said granules a reactive resin, for at least a time allowing a chemical reaction of said reactive resin to provide a solid agglomerate.

The granules used in the above disclosed method are preferably constituted by a material selected from polyurethane, polystyrene, paperboard, wood, rubber scraps or other inert material scraps.

It should be apparent to those skilled in the art that the vessel into which said granules are supplied can have any desired shape and size, in order to provide articles of manufacture meeting a lot of different requirements, said vessel operating as an actual mold for said articles of manufacture.

What is claimed is:

1. A method for making a solid agglomerate, having a preset size and shape, comprising a plurality of inert material particles, characterized in that said method comprises the steps of: rotating said inert material particles, applying on the surfaces of said rotating particles a reactive resin including at least a resin component, supplying said particles to a vessel, for holding each said particle in contact with adjoining particles at least for a time allowing said reactive resin to chemically react to provide said agglomerate.

2. A method according to claim 1, characterized in that said particle rotating step is performed by using at least a pair of conveyor belts, arranged with opposite portions thereof to form a conveying path for slidably conveying therethrough said rotating particles, said rotating particles contacting said pair of conveyor belts for at least a portion of the sliding movement of said particles, said conveyor belts having feeding speeds which are different in absolute value and/or direction.

3. A method according to claim 2, characterized in that said step for applying said reactive resin on said particles is carried out by delivering said reactive resin on at least one of said conveyor belts, at a portion of said conveyor belt overlapping said vessel.

4. A method according to claim 1, characterized in that said resin applying step applies a two-component reactive resin.

5. A method according to claim 4, characterized in that said resin applying step is carried out by delivering a first component of said reactive resin on one of said conveyor belts, and the second component on the conveyor belt opposite to said one conveyor belt, so as to cause said first and second component, as said two conveyor belts are driven, to be brought into contact and mixed on the surfaces of the rolling particles.

6. A method according to claim 4, characterized in that said resin applying step is carried out by delivering a first component of said reactive resin on both said conveyor belts of a first conveyor belt pair, and delivering the second component of said reactive resin on both the conveyor belts of a second conveyor belt pair, underlaying said first conveyor belt pair, to cause the first and second components to be brought into contact and mixed on the surfaces of the rolling particles, in the path defined by said second conveyor belt pair.

7. A method according to claim 1, characterized in that said chemical reaction is a polymerizing reaction.

8. A method according to claim 1, characterized in that said particles are supplied to a vessel holding at least an article therein, said particles filing-in any available spaces between at least an article and the inner sides of said vessel, so as to form, after said chemical reaction, a solid agglomerate adapted to package at least an article.

9. A method according to claim 1, characterized in that said particles comprise a material selected from polyurethane, polystyrene, paperboard, wood, rubber scraps or other inert material scraps.

10. A method according to claim 1, characterized in that said particles are in the form of granules, said granules being preferably spheroidal granules or granules having any other suitable shapes.

11. A method according to claim 1, characterized in that said reactive resin is selected from polyurethane, epoxy, phenolic, polyester, urea-formaldehyde resin, or other like resin types.

12. A method according to claim 1, characterized in that said method comprises a further step of grinding inert material scraps to provide a plurality of particles, said grinding step preceding said particle rotating or rolling step.

* * * * *